US010294878B2

(12) United States Patent
Ali Khan et al.

(10) Patent No.: US 10,294,878 B2
(45) Date of Patent: May 21, 2019

(54) WASTEGATE CONTROL SYSTEMS AND METHODS FOR ENGINE SOUND EMISSION

(71) Applicant: GM Global Technology Operations LLC, Detroit, MI (US)

(72) Inventors: Maqsood Rizwan Ali Khan, Rochester Hills, MI (US); Mark R. Claywell, Birmingham, MI (US); Scott M. Reilly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 15/079,790

(22) Filed: Mar. 24, 2016

(65) Prior Publication Data

US 2017/0241354 A1 Aug. 24, 2017

Related U.S. Application Data

(60) Provisional application No. 62/299,192, filed on Feb. 24, 2016.

(51) Int. Cl.
*F01N 1/16* (2006.01)
*F02B 37/18* (2006.01)
(Continued)

(52) U.S. Cl.
CPC ......... *F02D 41/0007* (2013.01); *F01N 1/168* (2013.01); *F02B 37/18* (2013.01);
(Continued)

(58) Field of Classification Search
CPC ............... F02D 41/0007; F02D 41/021; F02D 41/0225; F02D 41/022; F02D 2200/602;
(Continued)

(56) References Cited

U.S. PATENT DOCUMENTS

| 4,245,604 A | * | 1/1981 | Lahiff | .................. | B60W 10/06 123/478 |
| 4,373,337 A | * | 2/1983 | Widmann | ............... | F02B 37/16 60/611 |

(Continued)

FOREIGN PATENT DOCUMENTS

| DE | 102012106515 A1 | 1/2014 | | |
| JP | 60187730 A | * | 9/1985 | ............. F02D 41/08 |

(Continued)

OTHER PUBLICATIONS

U.S. Appl. No. 15/004,288, filed Jan. 22, 2016, Seldon et al.
(Continued)

*Primary Examiner* — Sizo B Vilakazi
*Assistant Examiner* — Brian R Kirby

(57) ABSTRACT

A turbocharger control system of a vehicle includes a trigger module that generates a trigger signal when a transmission of the vehicle is in one of (i) park and (ii) neutral. A wastegate target module, in response to the generation of the trigger signal, sets a target opening of a turbocharger wastegate to a predetermined opening and independently of a position of an accelerator pedal. The predetermined opening is greater than zero percent opening of the turbocharger wastegate. A wastegate actuator module actuates the turbocharger wastegate based on the target opening of the turbocharger wastegate.

18 Claims, 5 Drawing Sheets

(51) Int. Cl.
  *F02D 11/10*   (2006.01)
  *F02D 41/00*   (2006.01)
  *F02D 41/02*   (2006.01)

(52) U.S. Cl.
  CPC ......... *F02D 41/021* (2013.01); *F02D 41/022* (2013.01); *F02D 41/0225* (2013.01); *F02D 11/105* (2013.01); *F02D 2200/501* (2013.01); *F02D 2200/602* (2013.01); *Y02T 10/144* (2013.01)

(58) Field of Classification Search
  CPC .. F02D 2200/501; F02D 11/105; F01N 1/168; F02B 37/18; Y02T 10/144
  USPC .......................................................... 60/602
  See application file for complete search history.

(56) References Cited

U.S. PATENT DOCUMENTS

| | | | | |
|---|---|---|---|---|
| 4,377,070 A * | 3/1983 | Shadbourne | F02B 37/186 | 60/602 |
| 4,660,526 A * | 4/1987 | Horii | F02B 39/12 | 123/559.3 |
| 4,869,132 A * | 9/1989 | Clem | B60W 30/18 | 477/109 |
| 5,692,052 A | 11/1997 | Tanaka et al. | | |
| 5,950,432 A * | 9/1999 | Zimmer | F02B 37/16 | 60/605.1 |
| 6,085,525 A * | 7/2000 | Håkansson | F02D 9/14 | 251/63.5 |
| 6,205,784 B1 * | 3/2001 | Knaack | F01D 17/105 | 60/602 |
| 6,210,149 B1 | 4/2001 | Plavnik et al. | | |
| 6,705,084 B2 * | 3/2004 | Allen | F02B 37/10 | 60/608 |
| 6,782,877 B2 * | 8/2004 | Nau | F02B 37/04 | 123/559.3 |
| 8,919,118 B2 * | 12/2014 | Gentile | F02B 37/22 | 60/602 |
| 9,267,426 B2 * | 2/2016 | Makino | F02B 37/127 | |
| 2002/0078934 A1 * | 6/2002 | Hohkita | F01N 3/2006 | 123/564 |
| 2003/0164166 A1 * | 9/2003 | Takeuchi | F02D 41/0085 | 123/674 |
| 2006/0213194 A1 * | 9/2006 | Hasegawa | F01N 3/00 | 60/602 |
| 2008/0066723 A1 * | 3/2008 | Eiraku | F02B 39/16 | 123/564 |
| 2009/0005216 A1 * | 1/2009 | Whitney | B60K 6/48 | 477/107 |
| 2009/0031723 A1 * | 2/2009 | Gehrke | F02B 37/12 | 60/603 |
| 2009/0101121 A1 * | 4/2009 | Okamura | F02B 37/16 | 123/564 |
| 2011/0045948 A1 * | 2/2011 | Doering | B60W 10/06 | 477/33 |
| 2011/0144884 A1 * | 6/2011 | Miah | B60W 10/06 | 701/102 |
| 2012/0010796 A1 * | 1/2012 | G V | B60W 30/19 | 701/70 |
| 2012/0222418 A1 * | 9/2012 | Watanabe | F02B 37/183 | 60/602 |
| 2012/0234004 A1 * | 9/2012 | Stoffels | F02D 23/00 | 60/605.1 |
| 2012/0279216 A1 * | 11/2012 | Otsuka | F02B 37/18 | 60/602 |
| 2013/0098032 A1 * | 4/2013 | Wade | F02D 41/064 | 60/602 |
| 2013/0142352 A1 | 6/2013 | Koch et al. | | |
| 2014/0137553 A1 * | 5/2014 | Ulrey | F02B 37/16 | 60/602 |
| 2014/0338307 A1 * | 11/2014 | Kokotovic | F02B 37/22 | 60/273 |
| 2015/0098803 A1 * | 4/2015 | Kronschnabl | F02B 37/16 | 415/145 |
| 2015/0120115 A1 * | 4/2015 | Chinbe | B60W 10/06 | 701/22 |
| 2015/0203091 A1 * | 7/2015 | Wang | B60W 10/02 | 701/22 |
| 2016/0102636 A1 * | 4/2016 | Styles | F02D 41/006 | 123/568.21 |
| 2016/0230648 A1 * | 8/2016 | Sanchez Perez | F02B 37/10 | |
| 2018/0030939 A1 * | 2/2018 | Muramatsu | F02D 9/02 | |

FOREIGN PATENT DOCUMENTS

| | | | | |
|---|---|---|---|---|
| JP | 60187730 A | * | 9/1985 | ............ F02D 41/08 |
| JP | 63-255518 | | 10/1988 | |
| JP | 03233135 A | * | 10/1991 | |
| JP | 03233135 A | * | 10/1991 | |
| JP | 03275940 A | * | 12/1991 | |
| JP | 03275940 A | * | 12/1991 | |
| JP | 09228848 A | * | 9/1997 | |
| JP | H09228848 A | * | 9/1997 | .......... Y02T 10/144 |
| JP | 2008014289 A | * | 1/2008 | .......... Y02T 10/144 |
| JP | 2010-248980 A | | 11/2010 | |
| KR | 2003-018943 | | 6/2003 | |
| KR | 20130012683 A | * | 2/2013 | ............. F02B 37/12 |

OTHER PUBLICATIONS

Disclosed Anonymously, "Utilization of Turbocharger Actuators to Enhance Engine Sound Character", Research Disclosure database No. 616033, published digitally Jul. 8, 2015, 2 pages.
First Office Action for Chinese Application No. 201610890429.1 dated Sep. 4, 2018; 7 pages.

* cited by examiner

WASTEGATE CONTROL SYSTEMS AND METHODS FOR ENGINE SOUND EMISSION

CROSS-REFERENCE TO RELATED APPLICATIONS

This application claims the benefit of U.S. Provisional Application No. 62/299,192, filed on Feb. 24, 2016. The disclosure of the above application is incorporated herein by reference in its entirety.

FIELD

The present disclosure relates to internal combustion engines and more particularly to systems and methods for controlling turbocharger wastegates for engine sound emission.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders generally increases the torque output of the engine.

Some engines may be equipped with one or more boost devices, such as one or more turbochargers or a supercharger. Boost devices pump air into the engine to increase efficiency and/or a maximum output capability of the engine. Superchargers are crankshaft driven, while turbochargers are driven by exhaust flow through an exhaust system.

SUMMARY

In a feature, a turbocharger control system of a vehicle is described. A trigger module generates a trigger signal when a transmission of the vehicle is in one of (i) park and (ii) neutral. A wastegate target module, in response to the generation of the trigger signal, sets a target opening of a turbocharger wastegate to a predetermined opening and independently of a position of an accelerator pedal. The predetermined opening is greater than zero percent opening of the turbocharger wastegate. A wastegate actuator module actuates the turbocharger wastegate based on the target opening of the turbocharger wastegate.

In further features, when the trigger signal is not generated, the wastegate target module sets the target opening of the turbocharger wastegate based on the position of the accelerator pedal.

In further features, when the trigger signal is not generated, the wastegate target module: decreases the target opening of the turbocharger wastegate when a driver actuates the accelerator pedal away from a predetermined resting accelerator pedal position; and increases the target opening of the turbocharger wastegate when the driver releases the accelerator pedal toward the predetermined resting accelerator pedal position.

In further features, the predetermined opening is at least 30 percent opening of the turbocharger wastegate.

In further features, the predetermined opening is less than 100 percent opening of the turbocharger wastegate.

In further features, the trigger module further generates the trigger signal when all of: the transmission is in one of (iii) a forward drive gear and (iv) a reverse drive gear; a clutch pedal is actuated away from a predetermined resting clutch pedal position; and a vehicle speed is less than a predetermined speed. The predetermined speed is greater than zero.

In further features, the trigger module does not generate the trigger signal when the clutch pedal is traveling toward the predetermined resting clutch pedal position.

In further features, the trigger module further generates the trigger signal when all of: the transmission is in one of (iii) a forward drive gear and (iv) a reverse drive gear; a clutch pedal is actuated away from a predetermined resting clutch pedal position; and a longitudinal acceleration of the vehicle is between a first predetermined acceleration and a second predetermined acceleration.

In further features, the trigger module does not generate the trigger signal when the clutch pedal is traveling toward the predetermined resting clutch pedal position.

In further features, at least one of the first and second predetermined accelerations is a negative value.

In a feature, a turbocharger control method for a vehicle is described. The turbocharger control method includes: generating a trigger signal when a transmission of the vehicle is in one of (i) park and (ii) neutral; in response to the generation of the trigger signal, setting a target opening of a turbocharger wastegate to a predetermined opening and independently of a position of an accelerator pedal, the predetermined opening being greater than zero percent opening of the turbocharger wastegate; and actuating the turbocharger wastegate based on the target opening of the turbocharger wastegate.

In further features, the turbocharger control method further includes, when the trigger signal is not generated, setting the target opening of the turbocharger wastegate based on the position of the accelerator pedal.

In further features, the turbocharger control method further includes, when the trigger signal is not generated: decreasing the target opening of the turbocharger wastegate when a driver actuates the accelerator pedal away from a predetermined resting accelerator pedal position; and increasing the target opening of the turbocharger wastegate when the driver releases the accelerator pedal toward the predetermined resting accelerator pedal position.

In further features, the predetermined opening is at least 30 percent opening of the turbocharger wastegate.

In further features, the predetermined opening is less than 100 percent opening of the turbocharger wastegate.

In further features, generating the trigger signal includes generating the trigger signal when all of: the transmission is in one of (iii) a forward drive gear and (iv) a reverse drive gear; a clutch pedal is actuated away from a predetermined resting clutch pedal position; and a vehicle speed is less than a predetermined speed. The predetermined speed is greater than zero.

In further features, the turbocharger control method further includes not generating the trigger signal when the clutch pedal is traveling toward the predetermined resting clutch pedal position.

In further features, generating the trigger signal includes generating the trigger signal when all of: the transmission is in one of (iii) a forward drive gear and (iv) a reverse drive gear; a clutch pedal is actuated away from a predetermined resting clutch pedal position; and a longitudinal acceleration of the vehicle is between a first predetermined acceleration and a second predetermined acceleration.

In further features, the turbocharger control method further includes not generating the trigger signal when the clutch pedal is traveling toward the predetermined resting clutch pedal position.

In further features, at least one of the first and second predetermined accelerations is a negative value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines of vehicles combust air and fuel within cylinders. Exhaust resulting from combustion within the cylinders flows through an exhaust system. Some engines include one or more turbochargers. Exhaust flow through the exhaust system drives a turbocharger turbine. The turbocharger turbine is mechanically coupled to a turbocharger compressor, and the turbocharger turbine drives the turbocharger compressor. The turbocharger compressor pumps air into the engine.

A turbocharger wastegate controls exhaust flow (i) through the turbocharger turbine and (ii) bypassing the turbocharger turbine. For example, opening the turbocharger wastegate increases exhaust bypassing the turbocharger turbine and, therefore, decreases an output of the turbocharger compressor. Conversely, closing the turbocharger wastegate increases exhaust flow through the turbocharger turbine and increases the output of the turbocharger compressor. More technically speaking, the wastegate increases to the work output of the turbine, and the compressor is the consumer of that work.

An engine control module (ECM) of a vehicle controls engine actuators based on a target engine output. According to the present disclosure, the ECM controls turbocharger wastegate opening to improve engine sound emission under some circumstances.

For example, the ECM may close the turbocharger wastegate from a fully or partially open position when a driver applies pressure to an accelerator pedal of the vehicle including times when a transmission of the vehicle is in drive, park, reverse, or neutral. This may be done, for example, to prepare the turbocharger to increase airflow into the engine.

Closing the turbocharger wastegate, however, attenuates natural engine sound characteristics by forcing exhaust flow through the turbocharger turbine. The ECM therefore, when the driver applies pressure to the accelerator pedal while the transmission is in park or neutral, maintains the turbocharger wastegate in the fully or partially open position or further opens the turbocharger wastegate to the fully or partially open position. Maintaining the turbocharger wastegate open or further opening the turbocharger wastegate allows more of the natural engine sound to be emitted and heard when the driver applies pressure to the accelerator pedal while the transmission is in park or neutral.

Figure 1:
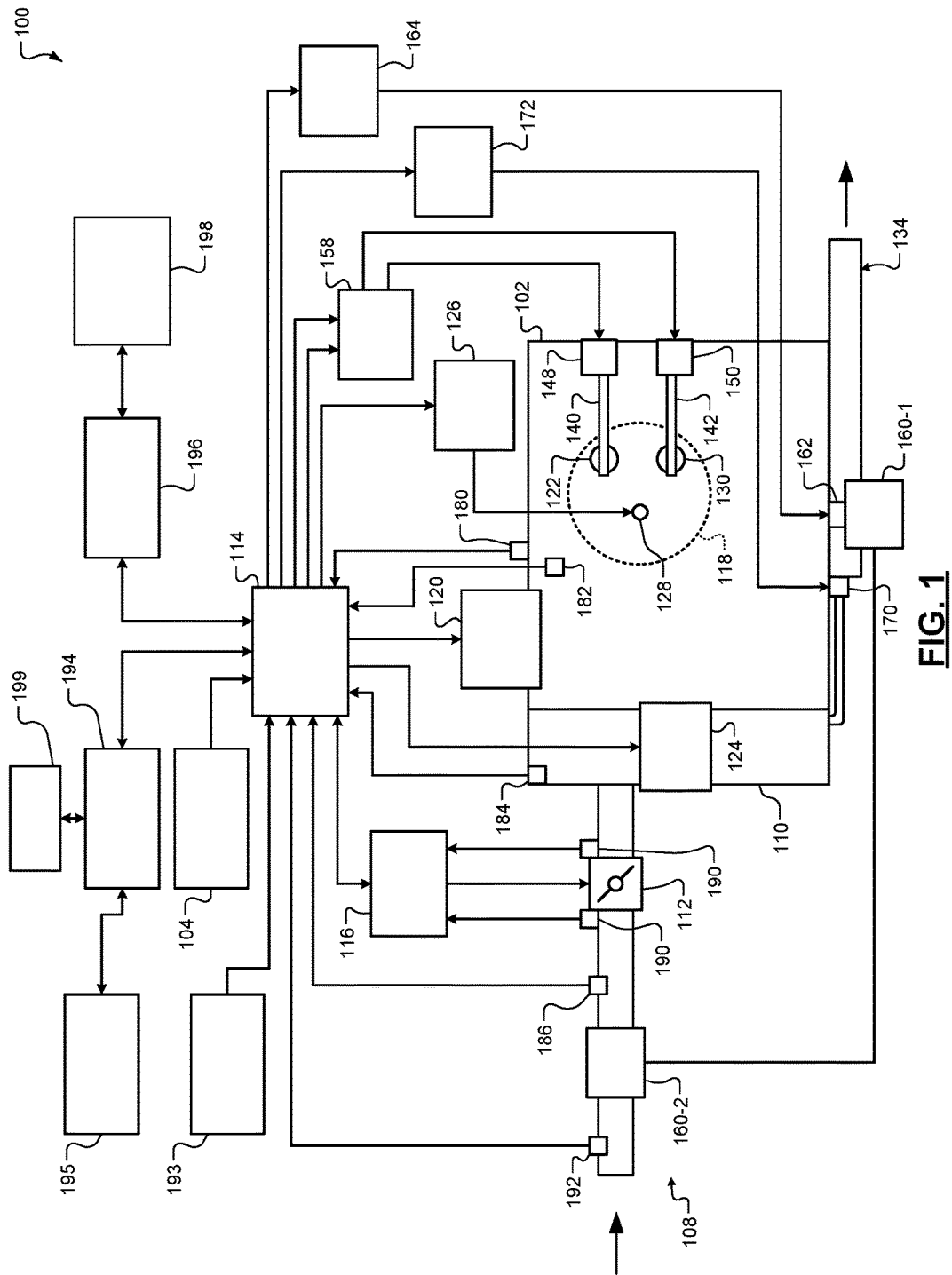
FIG. 1 is a functional block diagram of an example powertrain system.

Referring now to FIG. 1, a functional block diagram of an example powertrain system 100 is presented. The engine system 100 of a vehicle includes an engine 102 that combusts an air/fuel mixture to produce torque based on driver input from a driver input module 104.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 includes one or more turbochargers that provide pressurized air to the intake manifold 110. For example, FIG. 1 shows a turbocharger including a turbocharger turbine 160-1 that is driven by exhaust gases flowing through the exhaust system 134. The turbocharger also includes a turbocharger compressor 160-2 that is driven by the turbocharger turbine 160-1 and that compresses air leading into the throttle valve 112. As discussed further below, the engine system 100 may include more than one turbocharger, such as sequential or parallel turbochargers.

A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162. In various implementations, multiple turbochargers may be controlled by the wastegate actuator module 164. The turbocharger(s) may have variable geometry, which may be controlled by a turbo actuator module (not shown).

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The other sensors 193 may include a clutch position sensor and/or one or more other suitable sensors. The ECM 114 may use signals from the sensors to make control decisions for the engine system 100.

The other sensors 193 include an accelerator pedal position (APP) sensor, may include a clutch pedal position (CPP) sensor (e.g., in the case of a manual transmission), and may include one or more other types of sensors. An APP sensor measures a position of an accelerator pedal within a passenger cabin of the vehicle. A CPP sensor measures a position of a clutch pedal within the passenger cabin of the vehicle. The other sensors 193 may also include one or more acceleration sensors that measure longitudinal acceleration of the vehicle.

The ECM 114 may communicate with a transmission control module 194, for example, to coordinate engine operation with gear shifts in a transmission 195. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

The transmission 195 may be, for example, an automatic transmission or a manual transmission. In manual transmissions, the driver actuates the clutch pedal and manually shifts gears, for example, via a manual shift lever. In automatic transmissions, the transmission control module 194 may control gear shifts in response to driver input (e.g., commanded shifts via paddles) and/or based on various operating parameters.

In automatic transmissions, the transmission control module 194 controls the transmission 195 based on driver input to a park, reverse, neutral, drive, low (PRNDL) module 199. The PRNDL module 199 may indicate whether the driver has commanded operation of the transmission 195 in park, reverse, neutral, drive, low, or another transmission range. In manual transmissions, the transmission control module 194 may determine a gear that is currently engaged within the transmission 195 based on one or more gear sensors within the transmission 195 and/or one or more sensors of a position of the manual shift lever within the passenger cabin of the vehicle.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively. The ECM 114 may control the actuator values in order to cause the engine 102 to generate a requested engine output torque.

Figure 2:
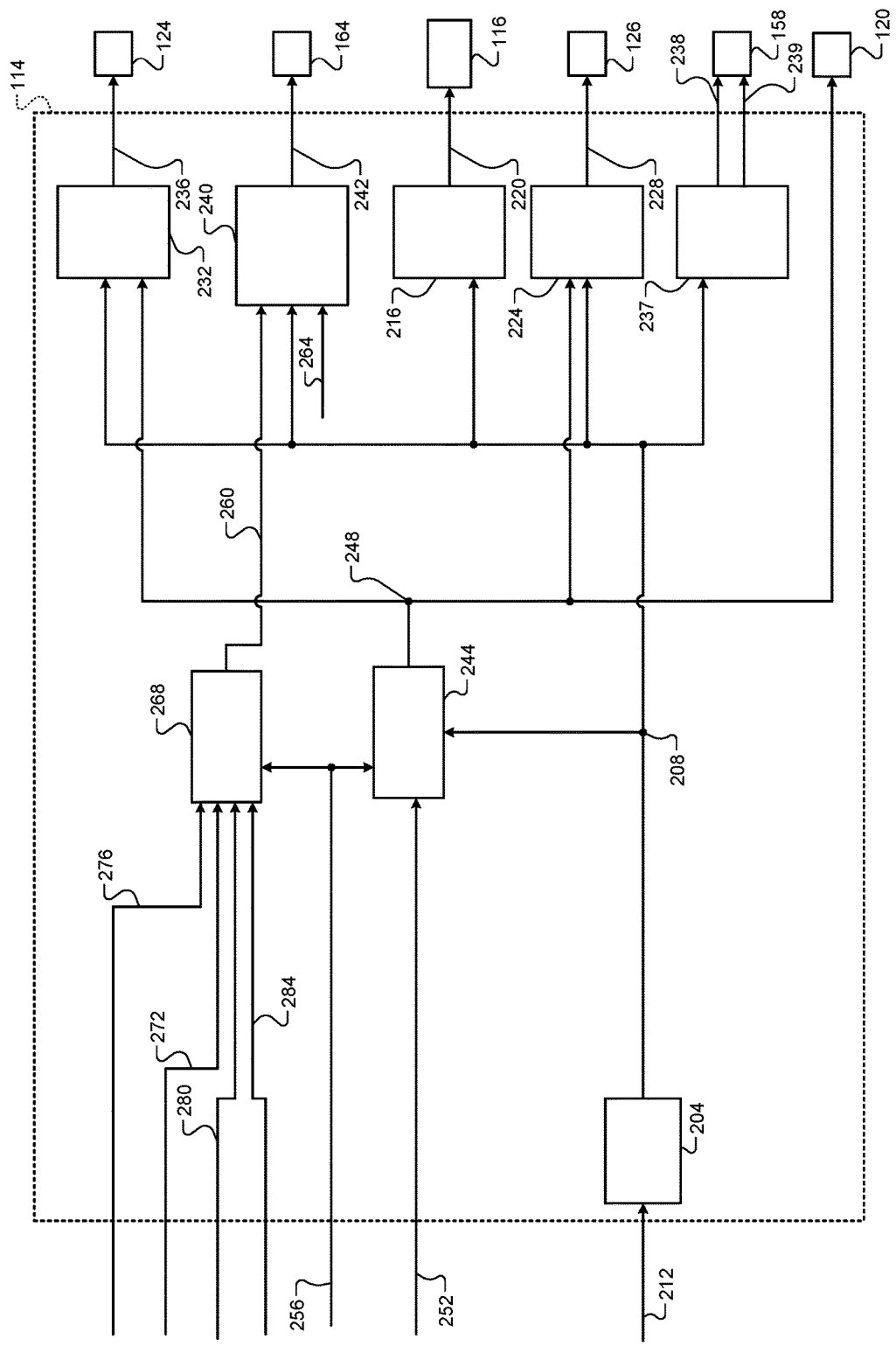
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. For example, the torque request 208 may increase as the accelerator pedal position increases (relative to a predetermined resting accelerator pedal position, such as zero) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle target module 216 may determine a target throttle opening 220 based on the torque request 208. The throttle actuator module 116 may adjust opening of the throttle valve 112 based on the target throttle opening 220.

A spark target module 224 determines a target spark timing 228 based on the torque request 208. The spark actuator module 126 generates spark based on the target spark timing 228. A fuel target module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser target module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

As discussed further below, a wastegate target module 240 sets a target wastegate opening 242. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel target module 232 halts fueling of the next cylinder when the activation/deactivation command 248 indicates that the next cylinder should be deactivated. The fuel target module 232 sets the target fueling parameters 236 to provide fuel to the next cylinder when the activation/deactivation command 248 indicates that the next cylinder should be activated. The spark target module 224 may provide spark to the next cylinder when the activation/deactivation command 248 indicates that the next cylinder should be activated. The spark target module 224 may provide or halt spark to the next cylinder when the activation/deactivation command 248 indicates that the next cylinder should be deactivated. Cylinder deactivation is different than fuel cutoff (e.g., deceleration fuel cutoff) in that the intake and exhaust valves of cylinders to which fueling is halted during fuel cutoff may still be opened and closed during fuel cutoff whereas the intake and exhaust valves of cylinders are maintained closed when those cylinders are deactivated.

The cylinder control module 244 may generate the activation/deactivation command 248 based on a target firing fraction. A numerator of the target firing fraction corresponds to a target number of cylinders to be activated (M) out of the next N cylinders in the predetermined firing order of the cylinders, and N is the denominator of the target firing fraction. For example, a target firing fraction of 5/8 indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The cylinder control module 244 may determine the target firing fraction, for example, based on the torque request 208, an engine speed 252, and a current gear 256 of the transmission 195. For example, the cylinder control module 244 may determine the target firing fraction using one of a function and a mapping that relates torque requests, engine speeds, and gear ratios to target firing fractions. The engine speed 252 may be determined, for example, based on crankshaft position measured using the crankshaft position sensor 180. The transmission control module 194 may determine the current gear 256, for example, based on signals from one or more gear sensors within the transmission 195 and/or a position of the manual shift lever As stated above, the wastegate target module 240 sets the target wastegate opening 242. The wastegate target module 240 may determine the target wastegate opening 242, for example, based on the torque request 208 during normal operation. The wastegate target module 240 may determine the target wastegate opening 242, for example, using one of a function and a mapping that relates torque requests to target wastegate openings. Additionally or alternatively, the wastegate target module 240 may determine the target wastegate opening 242 based on the APP, such as using one of a function and a mapping that relates APPs to target wastegate openings. The wastegate target module 240 may use, for example, interpolation when between entries of a mapping.

During normal engine operation, the wastegate target module 240 may set the target wastegate opening 242 to decrease as the torque request 208 (and/or the APP) increases and vice versa. The target wastegate opening 242 may correspond to the wastegate 162 being fully closed or to a maximum closure of the wastegate 162 before the torque request 208 reaches a maximum value.

When a trigger signal 260 is generated, however, the wastegate target module 240 sets the target wastegate opening 242 to a predetermined opening 264 independently of the APP and the torque request 208. Independently of the APP may mean independently of the APP and all other parameters determined (directly and independently) based on the APP. The predetermined opening 264 is a fixed value and may be stored in memory. The predetermined opening 264 is calibrated and may correspond to a wastegate opening of, for example, approximately 30 percent to 100 percent.

A trigger module 268 selectively generates the trigger signal 260. The trigger module 268 generates the trigger signal 260 at times when the driver does not intend to accelerate the vehicle, such as when the transmission 195 is in park or neutral. Additionally or alternatively, the trigger module 268 may generate the trigger signal 260 when the driver has applied the clutch pedal. By setting the target wastegate opening 242 to the predetermined opening 264 under such circumstances, the wastegate 162 may be opened or maintained open to allow more of the natural sound of the engine 102 to be emitted when the driver increases the engine speed 252 (i.e., revs the engine 102) by applying pressure to the accelerator pedal.

When the driver increases the engine speed 252 (i.e., revs the engine 102) by applying pressure to the accelerator pedal, determining the target wastegate opening 242 based on the torque request 208 (and/or the APP) would cause closing of the wastegate 162 as discussed above. The closing of the wastegate 162 prepares the engine 102 to increase torque output, but the turbocharger turbine 160-1 also attenuates the engine sound.

Figure 3:
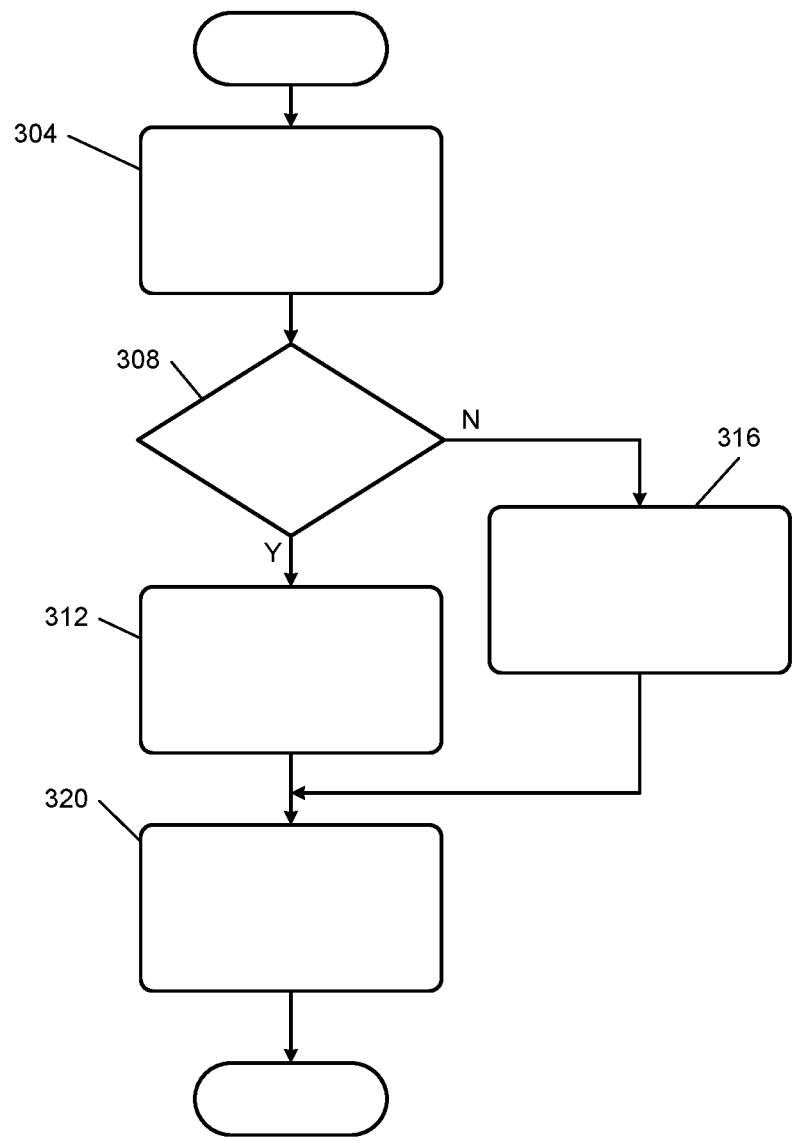
FIGS. 3-5 are flowcharts depicting example methods of controlling opening of a turbocharger wastegate to allow for emission of more engine sound.

Further operation of the trigger module 268 and the wastegate target module 240 will be discussed in conjunction with FIGS. 3-5. FIG. 3 includes a flowchart depicting an example method of controlling wastegate opening to allow for emission of more engine sound. The example of FIG. 3 may be used in vehicles having an automatic transmission or another type of transmission. Control begins with 304 where the wastegate target module 240 determines a wastegate opening based on the torque request 208 and/or the APP using one of a function and a mapping that relates torque requests and/or APPs to wastegate openings.

At 308, the trigger module 268 determines whether the transmission 195 is in park or neutral. For example, the trigger module 268 may determine whether the transmission 195 is in park or neutral based on whether a PRNDL signal 272 (FIG. 2) from the PRNDL module 199 (FIG. 1) indicates that that the driver has commanded that the transmission 195 be in Park or Neutral via a PRNDL device. The PRNDL device may include, for example, a PRNDL lever, a PRNDL knob, one or more physical PRNDL buttons, or one or PRNDL buttons on a touch screen display. As another example, the trigger module 268 may determine whether the transmission 195 is in park or neutral based on whether the current gear 256 is in park or neutral. The current gear 256 may be generated based on signals from one or more gear sensors within the transmission 195 or based on the position of the manual shift lever within the passenger cabin of the vehicle.

If 308 is true, the wastegate target module 240 sets the target wastegate opening 242 equal to or based on the predetermined opening 264 (and independently of the APP and the torque request 208) at 312, and control continues with 320. If 308 is false, the wastegate target module 240 sets the target wastegate opening 242 equal to or based on the wastegate opening (determined at 304) at 316, and control continues with 320. At 320, the wastegate actuator module 164 controls opening of the wastegate 162 based on the target wastegate opening 242.

Based on the use of the predetermined opening 264, more engine sound may be emitted including if the driver has applied pressure to the accelerator pedal. For example, when the predetermined opening 264 is used, the wastegate 162 will be more open than the wastegate opening determined at 304 if the driver has applied pressure to the accelerator pedal, for example, to increase the engine speed 252 (and rev the engine 102). This allows the driver to rev the engine 102 without closing the wastegate 162 to allow more engine sound to be emitted. While the example of FIG. 3 is shown as ending, control may return to 304.

Figure 4:
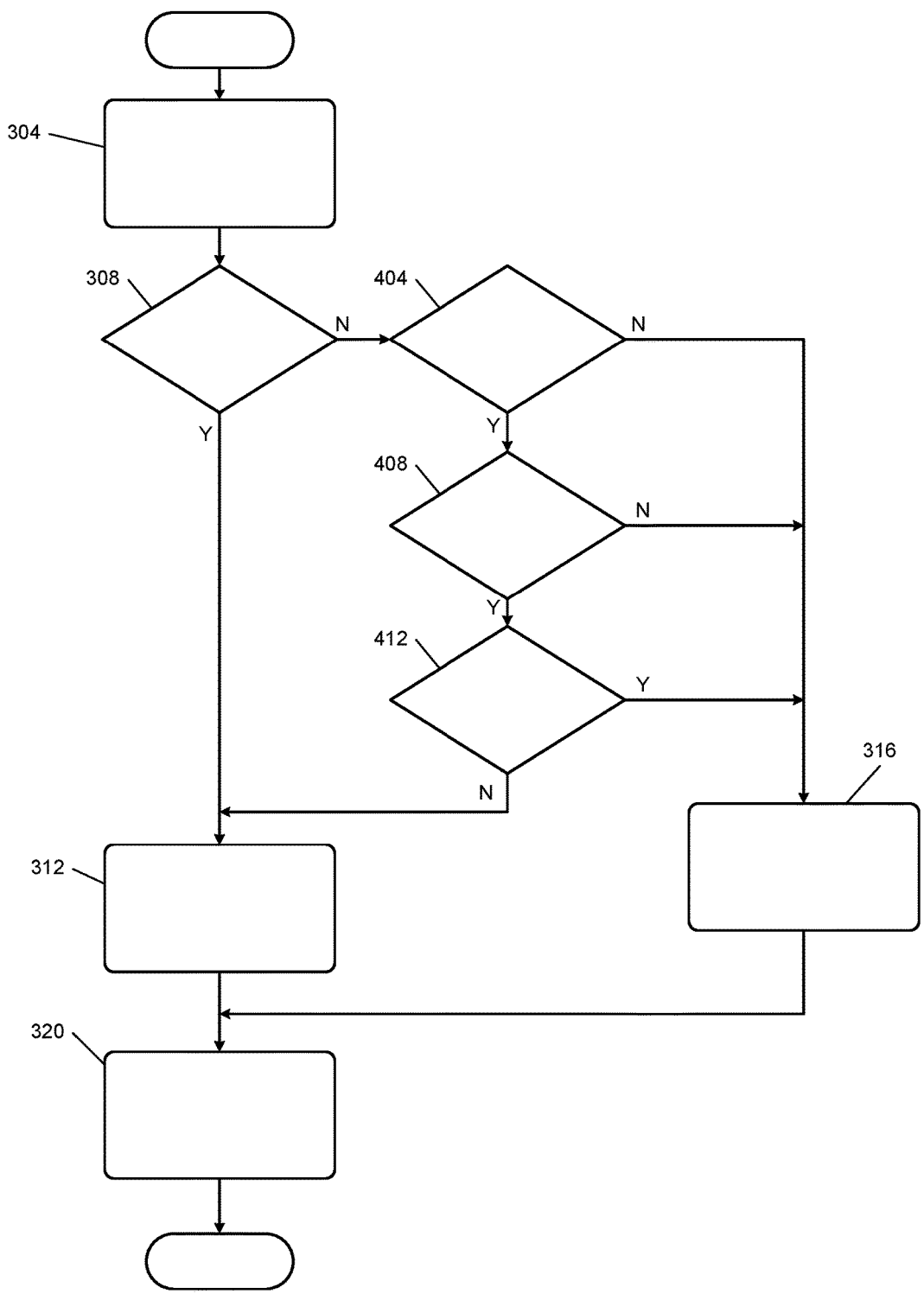

FIG. 4 includes a flowchart depicting an example method of controlling wastegate opening to allow for emission of more engine sound. The example of FIG. 4 may be used in vehicles having a manual transmission or another type of transmission. Control begins with 304 where the wastegate target module 240 determines a wastegate opening based on the torque request 208 and/or the APP using one of a function and a mapping that relates torque requests and/or APPs to wastegate openings.

At 308, the trigger module 268 determines whether the transmission 195 is in park or neutral. For example, the trigger module 268 may determine whether the transmission 195 is in park or neutral based on whether the current gear 256 is park or neutral. The current gear 256 may be generated based on signals from one or more gear sensors within the transmission 195 or based on the position of the manual shift lever within the passenger cabin of the vehicle. If 308 is true, the wastegate target module 240 sets the target wastegate opening 242 equal to or based on the predetermined opening 264 (and independent of the APP and the torque request 208) at 312, and control continues with 320. Based on the use of the predetermined opening 264, more engine sound may be emitted including if the driver has applied pressure to the accelerator pedal. If 308 is false, control continues with 404.

At 404, the trigger module 268 determines whether the transmission 195 is in a forward or reverse drive gear, such as a reverse, first gear, second gear, third gear, fourth gear, etc. If 404 is true, control continues with 408. If 404 is false, control transfers to 316, which is discussed further below. In various implementations, 404 being true may be assumed in response to the determination at 308 that the transmission 195 is not in park or neutral. In other words, when 308 is false, control may continue with 408 and 404 may be omitted.

At 408, the trigger module 268 determines whether a vehicle speed 276 (FIG. 2) is less than a predetermined speed. If 408 is true, control continues with 412. If 408 is false, control transfers to 316, which is discussed further below. The ECM 114 may determine the vehicle speed 276, for example, based on one or more wheel speeds measured using wheel speed sensors. For example, the ECM 114 may determine the vehicle speed 276 based on an average of speeds of driven wheels of the vehicle. The predetermined speed may be calibrated and may be, for example, approximately 5 miles per hour or less, or approximately 10 miles per hour or less.

At 412, the trigger module 268 may determine whether the driver is releasing the clutch pedal toward a predetermined resting position of the clutch pedal. For example, the trigger module 268 may determine whether a CPP (clutch pedal position) 280 (FIG. 2) is decreasing toward zero (corresponding to the predetermined resting position). The CPP 280 may be measured using one or more CPP sensors that measure position of the clutch pedal. If 412 is false, the wastegate target module 240 sets the target wastegate opening 242 equal to or based on the predetermined opening 264 (and independently of the APP and the torque request 208) at 312, and control continues with 320. Based on the use of the predetermined opening 264, more engine sound may be emitted if the driver has applied pressure to the accelerator pedal. If 412 is true, control may transfer to 316.

At 316, the wastegate target module 240 sets the target wastegate opening 242 equal to or based on the wastegate opening determined at 304, and control continues with 320. At 320, the wastegate actuator module 164 controls opening of the wastegate 162 based on the target wastegate opening 242. While the example of FIG. 4 is shown as ending, control may return to 304.

Figure 5:
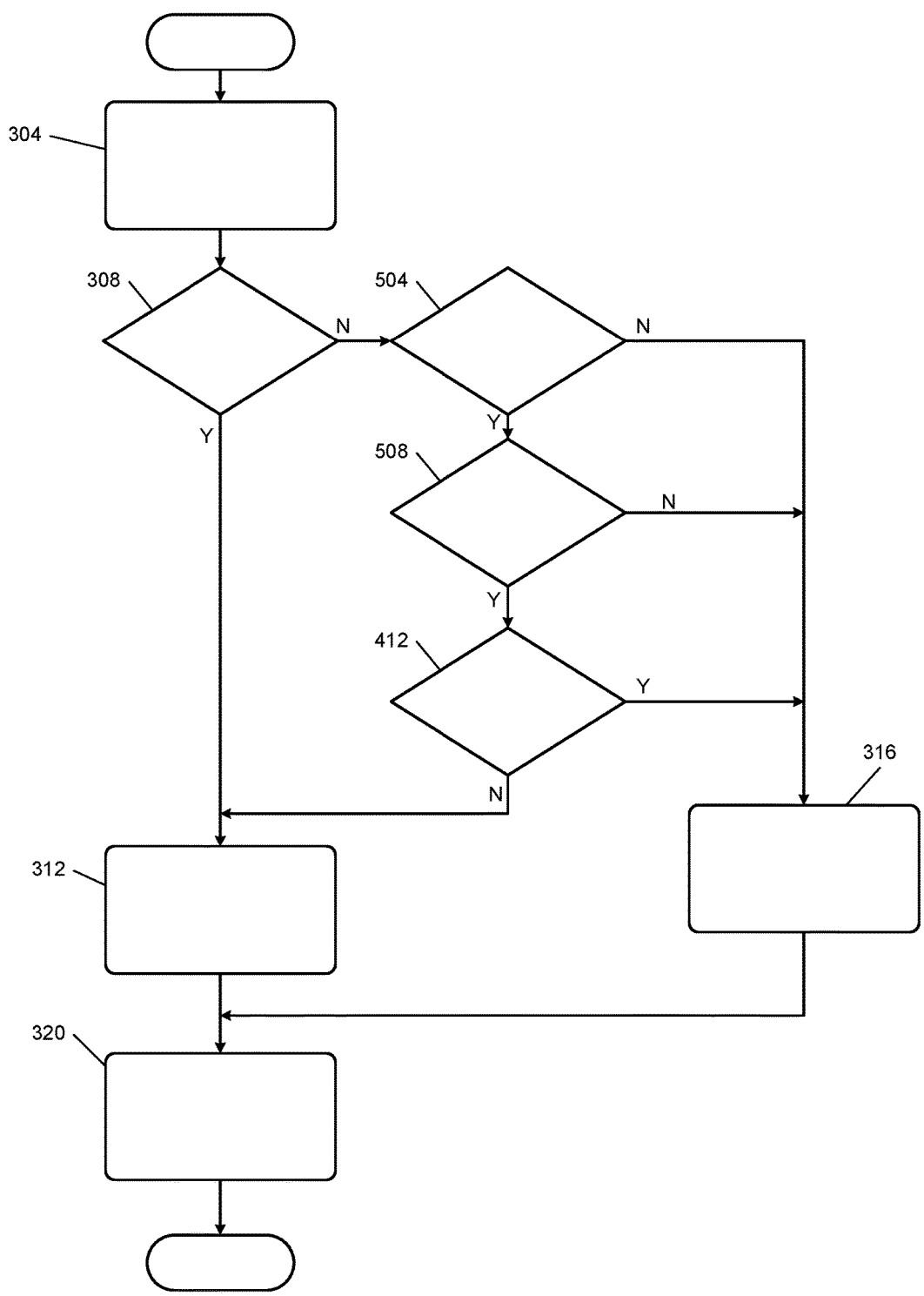

FIG. 5 includes a flowchart depicting an example method of controlling wastegate opening to allow for emission of more engine sound. The example of FIG. 5 may be used in vehicles having a manual transmission or another type of transmission. Control begins with 304 where the wastegate target module 240 determines a wastegate opening based on the torque request 208 and/or the APP using one of a function and a mapping that relates torque requests and/or APPs to wastegate openings.

At 308, the trigger module 268 determines whether the transmission 195 is in park or neutral. For example, the trigger module 268 may determine whether the transmission 195 is in park or neutral based on whether the current gear 256 is park or neutral. The current gear 256 may be generated based on signals from one or more gear sensors within the transmission 195 or based on the position of the manual shift lever within the passenger cabin of the vehicle. If 308 is true, the wastegate target module 240 sets the target wastegate opening 242 equal to or based on the predetermined opening 264 (and independently of the torque request 208 and the APP) at 312, and control continues with 320. Based on the use of the predetermined opening 264, more engine sound may be emitted if the driver has applied pressure to the accelerator pedal. If 308 is false, control continues with 504.

At 504, the trigger module 268 determines whether the driver has actuated the clutch pedal at least a predetermined amount. For example, the trigger module 268 may determine whether the CPP 280 is greater than a predetermined position at 504. The predetermined position is greater than zero where zero corresponds to the predetermined resting position of the clutch pedal. If 504 is true, control continues with 508. If 504 is false, control transfers to 316, which is discussed further below.

At 508, the trigger module 268 determines whether a longitudinal acceleration 284 (FIG. 2) of the vehicle is within a predetermined acceleration range. The longitudinal acceleration 284 may be measured, for example, using one or more longitudinal acceleration sensors of the vehicle. If 508 is true, control continues with 412. If 508 is false, control transfers to 316, which is discussed further below. The predetermined acceleration range may be calibrated and may be, for example, approximately 0 g and approximately −0.5 g (i.e., deceleration). This allows the driver to rev the engine 102 and experience increased engine sound emission, for example, during a downshift when some longitudinal deceleration is experienced.

At 412, the trigger module 268 may determine whether the driver is releasing the clutch pedal toward the predetermined resting position of the clutch pedal. For example, the trigger module 268 may determine whether the CPP 280 (FIG. 2) is decreasing toward zero. If 412 is false, the wastegate target module 240 sets the target wastegate opening 242 equal to or based on the predetermined opening 264 (and independently of the torque request 208 and the APP) at 312, and control continues with 320. Based on the use of the predetermined opening 264, more engine sound may be emitted including if the driver has applied pressure to the accelerator pedal. If 412 is true, control may transfer to 316.

At 316, the wastegate target module 240 sets the target wastegate opening 242 equal to or based on the wastegate opening determined at 304, and control continues with 320. At 320, the wastegate actuator module 164 controls opening of the wastegate 162 based on the target wastegate opening 242. While the example of FIG. 5 is shown as ending, control may return to 304.

While the example of a single turbocharger has been shown and described, the above is also applicable to implementations having two or more turbochargers, such as parallel and sequential systems of two or more turbochargers. In such implementations, the wastegates of one, more than one, or all of the turbochargers may be positioned at the predetermined opening 264 under the above circumstances. Further and concurrently with controlling the wastegates of one or more turbochargers at the predetermined opening 264, the wastegates of one or more of the turbochargers (but less than all of the turbochargers) may be controlled based on the target opening. This may provide a balance between engine sound emission and preparing to increase engine torque output.

Also, while the example of controlling wastegate opening based on the predetermined opening under the above circumstances, the present application is also applicable to opening or maintaining open vanes of a variable geometry turbocharger under the above circumstances. Controlling the vanes of the variable geometry turbocharger as described above in the example of wastegate control will provide similar engine sound emission characteristics.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for, " or in the case of a method claim using the phrases "operation for" or "step for. "

What is claimed is:

1. A turbocharger control system of a vehicle, comprising:
a trigger module that generates a trigger signal when a transmission of the vehicle is in park,
wherein the trigger module also generates the trigger signal when all of:
the transmission is in a reverse drive gear;
a clutch pedal is actuated away from a predetermined resting clutch pedal position; and
a longitudinal acceleration of the vehicle is between a first predetermined acceleration and a second predetermined acceleration;
a wastegate target module that, in response to the generation of the trigger signal, sets a target opening of a turbocharger wastegate to a predetermined opening and independently of a position of an accelerator pedal,
wherein the predetermined opening is greater than zero percent opening of the turbocharger wastegate; and
a wastegate actuator module that actuates the turbocharger wastegate based on the target opening of the turbocharger wastegate.

2. The turbocharger control system of claim 1 wherein, when the trigger signal is not generated, the wastegate target module sets the target opening of the turbocharger wastegate based on the position of the accelerator pedal.

3. The turbocharger control system of claim 2 wherein, when the trigger signal is not generated, the wastegate target module:
decreases the target opening of the turbocharger wastegate when a driver actuates the accelerator pedal away from a predetermined resting accelerator pedal position; and
increases the target opening of the turbocharger wastegate when the driver releases the accelerator pedal toward the predetermined resting accelerator pedal position.

4. The turbocharger control system of claim 1 wherein the predetermined opening is at least 30 percent opening of the turbocharger wastegate.

5. The turbocharger control system of claim 1 wherein the predetermined opening is less than 100 percent opening of the turbocharger wastegate.

6. The turbocharger control system of claim 1 wherein the trigger module also generates the trigger signal when all of:
the transmission is in one of a forward drive gear and the reverse drive gear;
the clutch pedal is actuated away from the predetermined resting clutch pedal position; and
a vehicle speed is less than a predetermined speed,
wherein the predetermined speed is greater than zero.

7. The turbocharger control system of claim 6 wherein the trigger module does not generate the trigger signal when the clutch pedal is traveling toward the predetermined resting clutch pedal position.

8. The turbocharger control system of claim 1 wherein the trigger module does not generate the trigger signal when the clutch pedal is traveling toward the predetermined resting clutch pedal position.

9. The turbocharger control system of claim 1 wherein at least one of the first and second predetermined accelerations is a negative value.

10. A turbocharger control method for a vehicle, comprising:
generating a trigger signal when a transmission of the vehicle is in park;
generating the trigger signal also when all of:
the transmission is in a reverse drive gear;
a clutch pedal is actuated away from a predetermined resting clutch pedal position; and
a longitudinal acceleration of the vehicle is between a first predetermined acceleration and a second predetermined acceleration;
in response to the generation of the trigger signal, setting a target opening of a turbocharger wastegate to a predetermined opening and independently of a position of an accelerator pedal,
wherein the predetermined opening is greater than zero percent opening of the turbocharger wastegate; and
actuating the turbocharger wastegate based on the target opening of the turbocharger wastegate.

11. The turbocharger control method of claim 10 further comprising, when the trigger signal is not generated, setting the target opening of the turbocharger wastegate based on the position of the accelerator pedal.

12. The turbocharger control method of claim 11 further comprising, when the trigger signal is not generated:
decreasing the target opening of the turbocharger wastegate when a driver actuates the accelerator pedal away from a predetermined resting accelerator pedal position; and
increasing the target opening of the turbocharger wastegate when the driver releases the accelerator pedal toward the predetermined resting accelerator pedal position.

13. The turbocharger control method of claim 10 wherein the predetermined opening is at least 30 percent opening of the turbocharger wastegate.

14. The turbocharger control method of claim 10 wherein the predetermined opening is less than 100 percent opening of the turbocharger wastegate.

15. The turbocharger control method of claim 10 wherein generating the trigger signal includes also generating the trigger signal when all of:

the transmission is in one of a forward drive gear and the reverse drive gear;

the clutch pedal is actuated away from the predetermined resting clutch pedal position; and a vehicle speed is less than a predetermined speed, wherein the predetermined speed is greater than zero.

16. The turbocharger control method of claim 15 further comprising not generating the trigger signal when the clutch pedal is traveling toward the predetermined resting clutch pedal position.

17. The turbocharger control method of claim 10 further comprising not generating the trigger signal when the clutch pedal is traveling toward the predetermined resting clutch pedal position.

18. The turbocharger control method of claim 10 wherein at least one of the first and second predetermined accelerations is a negative value.

* * * * *